United States Patent [19]
Auslander et al.

[11] Patent Number: 5,726,658
[45] Date of Patent: Mar. 10, 1998

[54] CDMA CODE GENERATOR EMPLOYING MIXING ERGODIC TRANSFORMATION

[75] Inventors: Louis Auslander, Pelham Manor; Paolo Barbano, New York, both of N.Y.; Urban Von der Embes, Westchester, Calif.; Xiang-Gen Xia, Westlake Village, Calif.; Roy M. Matic, Newberry Park, Calif.

[73] Assignee: HE Holdings, Inc., Los Angeles, Calif.

[21] Appl. No.: 657,250

[22] Filed: Jun. 3, 1996

[51] Int. Cl.$^6$ ............................................. G01S 7/292
[52] U.S. Cl. ........................ 342/204; 342/189; 375/200
[58] Field of Search ............................. 342/202, 159, 342/162, 189, 194, 195, 201, 203, 204; 375/200

[56] References Cited

U.S. PATENT DOCUMENTS

| | | | |
|---|---|---|---|
| 4,608,701 | 8/1986 | Burgers et al. | 375/200 |
| 5,007,087 | 4/1991 | Bernstein et al. | 380/46 |
| 5,486,833 | 1/1996 | Barrett | 342/204 |
| 5,511,009 | 4/1996 | Pastor | 364/572 |

OTHER PUBLICATIONS

Pickholtz et al., "Theory of Spread Spectrum Communications—A Tutorial", *IEEE Transactions On Communications*, vol. Com. 30, No. 5, May 1982, pp. 855-884.

Cornfeld et al., "Ergodic Theory", Springer-Verlag, 1982, pp. 3-137.

Borwein and Borwein, "π and the AGM", *Wiley Interscience*, 1978, pp. 1-61, 219-229.

Acton, "Numerical Methods That Work", Harper and Row, 1970, pp. 178-203.

*Primary Examiner*—John B. Sotomayor
*Attorney, Agent, or Firm*—V. D. Duraiswamy; W. K. Denson-Low

[57] ABSTRACT

A codeword generator produces codewords in the form of digital electronic signals which may be employed, for example, in spread spectrum communications system or RADAR systems. The generator effects a mixing ergodic transformation upon a suitable irrational number to produce a complex number sequence. The generator truncates the complex number sequence to a predetermined length, thus forming a codeword. The generator then forms other codewords within a family by permuting this first codeword. Other families of codewords may be generated by employing another mixing ergodic transform to transform the same irrational number or another suitable irrational number.

22 Claims, 5 Drawing Sheets

CDMA CODE GENERATOR EMPLOYING MIXING ERGODIC TRANSFORMATION

GOVERNMENT RIGHTS

The government has certain rights in this invention pursuant to Contract Number N00014-94-C-0252 awarded by the Department of the Navy to Hughes Aircraft Company and Contract Number F49620-93-1-0610 awarded to the City University of New York by the Department of the Air Force.

BACKGROUND OF THE INVENTION

1. Field of the Invention

The invention is related to pseudo-noise codes and, more particularly, to the generation of electronic signals which employ such codes.

2. Description of the Related Art

Spread-spectrum techniques are known and are employed in communications, guidance, and RADAR systems. See Raymond L. Pickholtz, Donald L. Schilling, and Laurance B. Millstein, *Theory of Spread Spectrum Communications-A Tutorial*, IEEE Transactions On Communications, VOL. COM. 30, NO. 5, May 1982, pp 855–884, for a discussion of the use of spread spectrum techniques in communications systems, for example. In a first order analysis, spread spectrum communications systems employ "pseudo noise" (PN) codewords at a transmitter to "spread" the bandwidth occupied by transmitted data beyond the minimum required by the data. The codewords are independent of the data being transmitted and are also employed by the system's receiver to synchronously receive and "despread" the transmitted data. Spread spectrum transmissions are less susceptible to jamming, to multipath interference and to fading than other transmissions.

Unlike time division multiple access (TDMA) communications systems, which permit multiple users to occupy the same bandwidth at different times, or frequency division multiple access (FDMA) systems, which permit multiple users to use different frequencies at the same time, spread spectrum code division multiple access (CDMA) techniques accommodate multiple users by permitting them to use the same frequency bandwidth at the same time. Ideally, each codeword yields a spectrum which appears as noise to other occupants of the frequency band and each additional user simply adds to the "noise floor" of the band until the maximum capacity of the channel is reached. Not only do CDMA communications systems provide security, i.e., the codeword is required to despread the signal, but, because the transmitted signals appear as noise to all but those who possess the codewords, it is difficult to even determine that a signal has been transmitted: an ideal attribute for covert communications systems.

RADAR systems also employ PN codes. For example, PN codes are used to modulate the RADAR's transmitted waveform so that multiple returns from different targets may be readily distinguished. Additionally, since the RADAR's pulses have been spread out in frequency and appear, to a first approximation, as noise, it is more difficult for a target to determine that it has been "lit up" by the transmitting RADAR.

In order to provide secure and covert communications and to modulate RADAR pulses with the greatest degree of flexibility possible, the PN codes, or codewords should be arbitrarily long and should provide an unlimited number of code families. That is, because the difficulty of "cracking" a code family increases significantly with the number of codewords available, and the number of codewords available within a family increases with the length of the codewords, the ideal code generator would provide an infinite number of codes, i.e., infinitely (arbitrarily) long codewords. Additionally, the codes should be nonpredictable, that is, a small sample set of the codes should not permit the prediction of subsequent codes.

To minimize errors, the codewords should be distinctive. That is, the crosscorrelation between any two codewords should be low and any codeword's autocorrelation should be steeply peaked, with small sidelobes. Minimal codeword crosscorrelation yields minimal interference between multiple users in a CDMA communications system or between multiple target reflections in a RADAR application. Similarly, maximally peaked codeword autocorrelation yields optimal acquisition and synchronization properties for both communications and RADAR applications. Furthermore, in order to avoid detection and acquisition, and to thereby enhance their utility in secure and covert applications, the codewords should exhibit additive white Gaussian noise (AWGN) properties. That is, the codeword power spectrum should resemble that of AWGN and the distribution of crosscorrelation values, both real and imaginary, should be Gaussian. In addition, to enhance target discrimination in RADAR applications, the power content of the code sidelobes (the average magnitude of the codewords' crosscorrelation values) should be inversely proportional to the number of codeword pairs that are averaged.

However, conventional codes, such as Gold codes and M sequences generally are not arbitrarily long. Existing code generators employ shift registers to generate codes, such as Gold codes and M-sequence codes. Unfortunately, these codes are limited in length to $2^N-1$, where N is the number of locations within the generating shift register. Furthermore, existing codes do not yield AWGN spectral characteristics. For example, a histogram of Gold codes' auto- and cross-correlation values does not possess desirable, noise-like Gaussian distribution characteristics, rather, it has three distinct values. Consequently, signals which employ these codes are more easily detected than may be desired. That is, a transmission from a covert communications system employing a Gold code would be more easily detected than a transmission which produces AWGN statistics because the transmissions with AWGN statistics appear as noise to an intercepter, whereas a non-AWGN transmission will exhibit characteristics that identify it as a transmission with some information content. Similarly, it would be much easier for a RADAR target to determine that it has been "lit up" by RADAR employing codes which do not produce AWGN statistics.

With conventional codeword generators, the number of code families is limited and the number of codewords within each family is usually less than or equal to the codeword length. Furthermore, linear codewords built from shift registers can be predicted if N bits out of 2N-1 bits of the codeword are known. This precludes the use of such codes in secure and covert communications applications. Additionally, the distribution of crosscorrelation values for conventional codewords is not Gaussian, again limiting the utility of such codes in covert and secure communications applications and in RADAR applications.

SUMMARY OF THE INVENTION

The invention is directed to a codeword generator and method of generation that reduces the detectability and improves the security of systems which employ the codes.

The new codeword generator produces codewords in the form of digital electronic signals by operating a mixing ergodic transformation upon a suitable irrational number to produce a complex number sequence and then truncating the sequence to a predetermined length to form a codeword. The generator then forms other codewords within a family by permuting the first codeword. Other families of codewords may be generated by employing another mixing ergodic transform to transform the same irrational number or another suitable irrational number.

In a preferred embodiment, the desired codeword length and a decimal expansion of a suitable irrational number are provided to the generator "off-line". However, other embodiments of the generator may include an irrational number decimal expander and autocorrelator which respectively, expand and test for the suitability of candidate irrational numbers.

The new codeword generator is particularly suited to application in covert and secure communications and RADAR systems, where it may produce an unlimited number of codewords for combination with data or RADAR pulses and thereby thwart interception of these transmissions. Furthermore, the codewords exhibit the AWGN characteristics which make transmissions built upon them appear noise-like, further enhancing their utility in these applications. Additionally, the new codewords are nearly orthogonal to Gold code codewords and, therefore, may be operated along with existing systems using Gold codes in the same channel with minimal interference. The new codeword generator provides an infinite number of code families and the codewords within each family may be arbitrarily long. Unlike conventional linear codes, codes produced by the new code generator are not predictable from a small sample set. The codewords are complex-valued, of unit magnitude, and may be implemented with varying numbers of discrete complex values, providing a tradeoff between ease of implementation and AWGN statistics.

These and other features, aspects and advantages of the invention will be apparent to those skilled in the art from the following detailed description, taken together with the accompanying drawings.

DETAILED DESCRIPTION OF THE INVENTION

Figure 1:
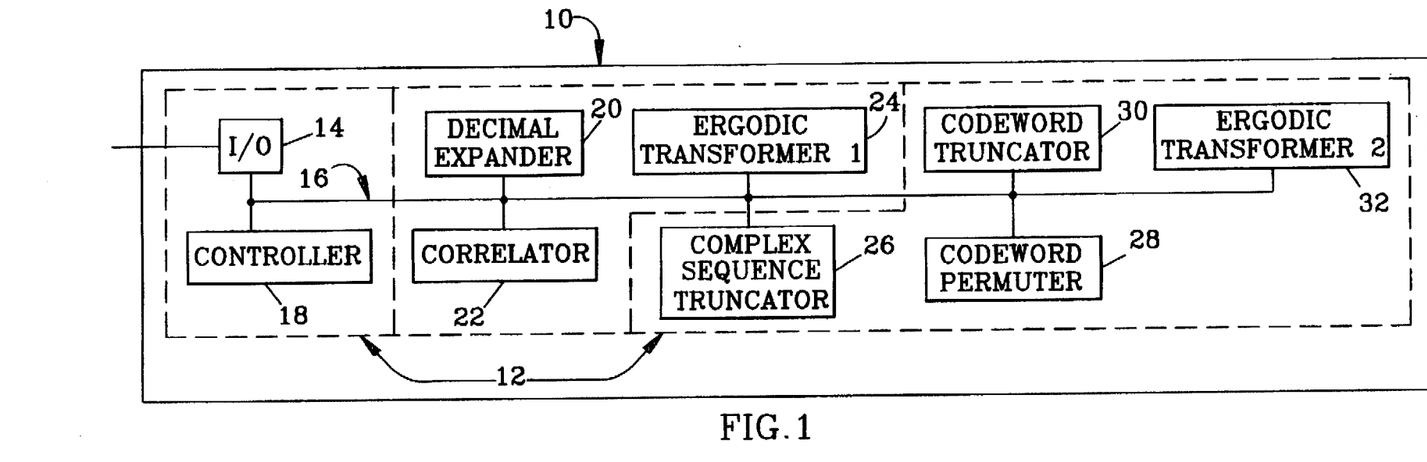
FIG. 1 is a functional-level block diagram of a codeword generator system based upon the new codeword generator.

The new codeword generator produces codewords in the form of digital electronic signals that may be used, for example, in spread spectrum communications and RADAR systems. The functional level block diagram of FIG. 1 illustrates the primary functions of a codeword system 10 based upon a new codeword generator 12. The system functions not contained within the codeword generator blocks 12 of this exemplary illustration could, optionally, be included within the code-word generator 12. An input/output system (I/O) 14 provides a bidirectional communications link to systems outside the codeword generator system 10. The I/O system 14 is connected through an internal bidirectional communications link 16 to the other components of the codeword generator system 10. The link 16 provides a communications path for all the components of the new code generator 12. A controller 18 is connected through the link 16 to the remaining system components and controls the timing and interaction of those components.

Figure 2:
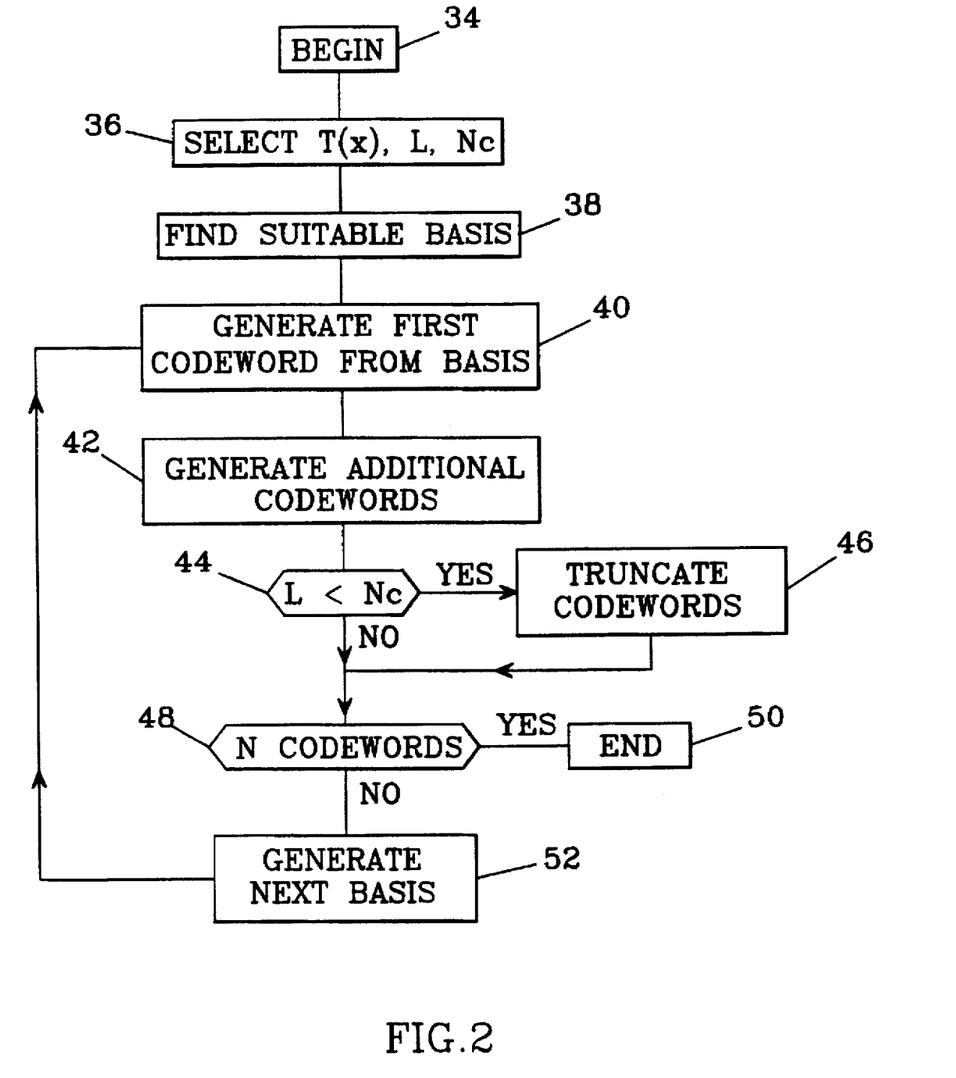
FIG. 2 is a flow chart which illustrates the sequential operation of the new codeword generator.

In the preferred embodiment, a decimal expander 20 and correlator 22, although a part of the code generator system, are "offline" from the codeword generator 12. The decimal expander, as will be described in greater detail in relation to FIG. 2, provides a decimal expansion of irrational numbers, e.g., 3.1415 is a five digit decimal expansion of $\pi$. The correlator 22, again, as will be described in greater detail in relation to FIG. 2, autocorrelates a complex valued sequence based upon the decimal expansion provided by the decimal expander 20. The correlator 22 determines the suitability of a particular decimal expansion for use as a "basis" for codewords based upon this autocorrelation. A first mixing ergodic transformer 24 transforms candidate decimal expansions to produce the complex valued sequence which is autocorrelated by the correlator 22. Mixing ergodic transformations are known. For a detailed discussion see Cornfeld, Fomin, Sinai, *Ergodic Theory*, Springer-Verlag, 1982, pp 3–137.

Given a complex sequence developed by the ergodic transformer 24 and checked for suitability by the correlator 22, a complex sequence truncator 26 truncates the sequence to produce a codeword C1. A codeword permuter 28 permutes the codeword C1 to produce additional codewords. A codeword truncator 30 truncates codewords, under direction of the controller 18, to a desired length. To generate additional families of codes, a second ergodic transformer 32, which performs a different transformation from that of the ergodic transformer 24, transforms the decimal expansion used to generate the first code family. Additional transformers may be employed to generate additional code families, as may additional irrational number decimal expansions.

The flow chart of FIG.2 illustrates the sequential operation of the new code generator system 10. Generation of a code starts with BEGIN 34 and proceeds to step 36. In step 36 a mixing ergodic transform T(x) is chosen. In the preferred embodiment, a suitable transform is provided to the code generator. The transform T maps a value x defined on the unit interval ([0,1) to another value T(x), also on the unit interval. An example of a mixing ergodic transform is given by:

$$T(x)=(nx)-int(nx)$$

where:

n=an integer greater than or equal to 2 int=a function which returns the integer value of its argument

In other words, the transform T(x) multiplies a number x by an integer greater than 2, subtracts the integer value of this product from the product, thereby yielding the product's fractional value, i.e., all the terms to the right of the decimal point. The desired codeword length L is a system design parameter, i.e., the degree to which the spectrum is spread is proportional to the codeword length. The total desired number of codewords N is also a system design parameter; the difficulty of "cracking" a code increases significantly with the number of codewords and, in many systems each user is assigned a separate codeword. Both N and L are downloaded to the code generator 12 through the I/O system 14 in the preferred embodiment. Experiments indicate that the transform T(x) works well with n=10.

The code generator system 10 then proceeds to step 38 where a suitable basis for the code is found. In the preferred embodiment, this step is performed offline by the correlator 22 and ergodic transformer 24. Qualitatively, a suitable basis provides a good digit distribution, that is, one that doesn't contain any long digit patterns which repeat periodically. To find such a basis, the decimal expander 20 provides a decimal expansion W of an irrational number such as $\pi$ or $\sqrt{2}$ to the ergodic transformer 24. The ergodic transformer forms a complex-valued sequence Y of length Q:

$$Y=(a_0, a_1, \ldots a_{Q-1})$$

where:

$$a_k = \exp[i2\pi T^{k+p}(W)]$$

and:

W=candidate irrational number

P=starting point within the decimal expansion of W $T^m$ indicates that the ergodic transform T should be iterated m times Once the ergodic transformer 24 constructs the complex number sequence in this fashion, the correlator 22 autocorrelates the sequence Y:

$$R_{yy}(n) = \Sigma Y(k) Y^*(k+n)$$

where the summation is taken from k=0 to Q-1.

If the maximum magnitude of $R_{yy}(n)$ for all n except n=0 is relatively small (i.e., less than $4/\sqrt{Q}$), the number Wp, the irrational number which "starts" at the pth location of the decimal expansion of W, is a suitable choice for a basis from which a new code may be produced.

After a basis has been selected in this fashion, operation proceeds to step 40 where the code generator 12 produces the first codeword of a code. For a given target codeword length L, the complex sequence truncator 26 truncates the complex sequence $a_k$ to a length Nc, where Nc is a prime number greater than or equal to the desired codeword length L. That is, a first codeword $C_1$ is generated:

$$C_1 = (a_0, a_1, \ldots a_{Nc-1})$$

where:

$C_1$=continuous-valued complex number sequence

Since a practical implementation of the code generator requires some "quantization" of the complex values, the continuous valued complex numbers are quantized in this step. For example, if eight discrete complex numbers are allocated as possible values for each number $a_k$, each $a_k$ is assigned whichever of the following values, 1, $\sqrt{2}/2 + j\sqrt{2}/2$, $0+j$, $-\sqrt{2}/2 + j\sqrt{2}/2$, $-1$, $-\sqrt{2}/2 - j\sqrt{2}/2$, $-j$, or $\sqrt{2}/2 - j\sqrt{2}/2$ is closest, yielding the codeword:

$$C_1 = (a_0, a_1, \ldots a_{Nc-1})$$

The quantization numbers e.g., 1, $\sqrt{2}/2 + j\sqrt{2}/2$, may be "fixed" in permanent memory locations or they may be downloaded as a parameter.

Next, in step 42, the code generator produces additional codewords within the codeword permuter 28 by permuting the first codeword C1 as follows:

$$C_m(k) = C_1(mod((m)(k+1)), Nc) \text{ for } 2 \leq m \leq Nc-1, 0 \leq k < Nc$$

That is, the value of code Cm at index k equals the value of code C1 at index (m)(k+1), modulo Nc. For example, if the code length Nc is 997, the value of code $C_{113}$ at index 50 equals the value of code C1 at index (51)(113), or 5736, modulo 997, which equals 778 or, $C_{113}(50)=C_1(778)$. The permuter 28 generates $N_c-2$ additional codewords by "shuffling" the original codeword $C_1$ in this manner.

After generating the additional codewords, the controller 18 determines in step 44 whether the desired codeword length L is less than the value of the prime number Nc and, if it is, the generator 12 proceeds to step 46 where the codeword truncator 30 truncates the codewords to length L. That is, the last Nc-L complex values of each codeword are deleted by the truncator 30. This step allows the construction of code families where each member, or codeword, has an arbitrary length from 1 to Nc, and Nc may be arbitrarily large. After truncating the codewords, the generator 12 proceeds to step 48, as it does directly if the controller 18 determines in step 44 that the desired codeword length equals the prime number Nc.

In step 48, the controller 18 determines whether the target number of codewords N has been generated and, if they have, the generator proceeds to step 50 END and terminates operation. If, on the other hand, more codewords are required, the generator proceeds to step 52 where another basis for additional codewords is generated. The second mixing ergodic transformer 32, which employs a mixing ergodic transformation that is different from the first transformer 24, transforms the original basis Wp to produces another basis Wr. That is, a new basis Wr is produced from the original basis Wp:

$$Wr = \phi^r(Wp)$$

where:

$\phi^r$=the second mixing ergodic transform

An example of another mixing ergodic transform $\phi^r$ which may be used for this operation is given by the expression:

$$\phi(x) = (n)(x) + \beta - int[(n)(x) + \beta]$$

where:

n=an integer $\beta$=a real number in the unit interval

Experiments indicate that the transform $\beta r$ works well with values of n=2 and $\beta=0$. After generating an additional basis in this manner, the generator 12 returns to step 40 and proceeds as previously described.

The number of digits required in the decimal expansion of the initial basis Wp is determined by the number of codewords desired, the desired length of the codewords, the desired precision and the initial starting point p. Assume that for every complex value in the initial codeword C1 we require R digits of precision. Since the codewords are Nc digits long, there must be Nc+R digits in the expansion and, if the decimal expansion is begun at location p, there must be p+Nc+R digits for the first Nc-1 codewords. If N>Nc-1, then additional bases must be generated and one additional digit is required for each new basis. The required number of digits in the decimal expansion of the initial basis is therefore given by the expression:

$$Q = p + R + Nc + ceil[N/(Nc-1)] - 1$$

where:

Nc=the closest prime number greater than the desired length L

R=the number of digits of precision required for phase quantization

N=the total number codewords desired ceil=is a function which returns an integer that is equal to its argument or the next greater integer For example, to generate 1990 codewords using the decimal expansion of π, with eight digits of precision and assuming p=0, 996 codes may be generated from the first 997+8=1005 digits of π. An additional digit is required to generate a new basis for the second 996 codewords. The generation of the decimal expansion of irrational numbers is known. For example, the arithmetic geometric mean method for the decimal expansion of π is described in Borwein and Borwein, π and the AGM, pp 1–61, 219–229 Wiley interscience, 1978. Other irrational numbers may be expanded using polynomial root-finding techniques such as Newton's method. See Forma S. Acton, Numerical Methods That Work, pp 178–203 Harper and Row, 1970.

Unlike conventional codes, the new code generator can generate more codewords in a family than the length of a codeword. For example, assume there is a requirement for a family of codes with each code-word 500 complex numbers long. The new generator 12 can use the prime number 997, generate 996 codewords, then truncate each of the codewords to 500 complex numbers in length. Even more codewords may be generated by starting with a larger prime number or by generating new bases as described above. The number of codewords in a family may also be increased by changing the value of the p-digit offset. For example, assume the generator produces 996 codewords using the first 1005 digits of π (i.e., p=0). The generator can then generate an additional 996 codes using the next 1005 digits of π by setting p=1006. Further codeword generation may be achieved by changing the codeword family basis W to an expansion of √2 or other irrational number, rather than π, for example. The codewords generated by the different bases retain orthogonality and the desirable code properties described above. Furthermore, longer codewords may be generated by concatenating shorter codewords. For example, a codeword of length 9970 could be produced by concatenating ten codewords of 997 complex numbers.

Figure 3:
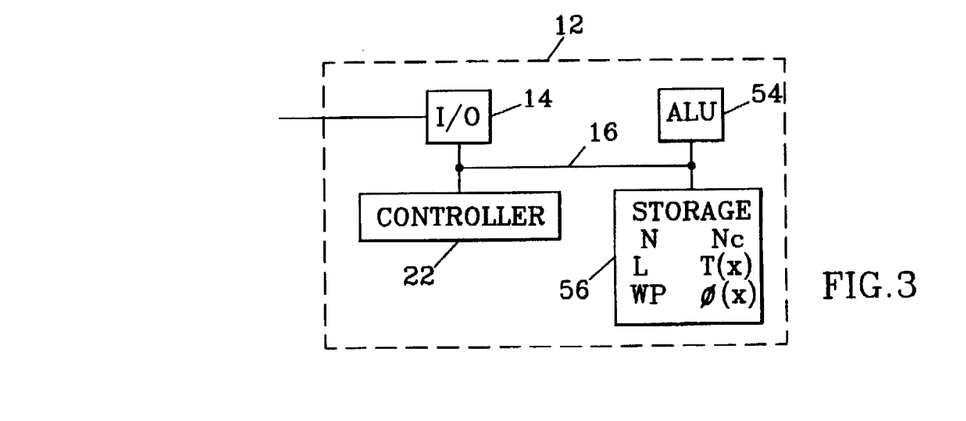
FIG. 3 is a block diagram of a preferred embodiment of the new code-word generator.

A preferred embodiment of the code generator 12 includes the components illustrated in FIG.3. The I/O system 14, bidirectional data link 16, and controller 22 are as described in relation to FIG.1. An arithmetic and logic unit ALU 54 and digital storage 56 are also connected to the data link 16. The physical implementation of these components may take many forms. For example, an application specific integrated circuit (ASIC), or digital signal processing integrated circuit, DSP chip, could incorporate all the illustrated components. The storage 56 could be implemented as electronic, magnetic, or optical storage and, in the preferred embodiment such values as the total number of codewords desired N, the desired codeword length L, a prime number greater than the desired codeword length Nc, a decimal expansion Wp, the quantization numbers, and instructions required to perform a first ergodic transform T(x) and second ergodic transform φ(x) may all be contained within the storage system 56.

In the preferred embodiment, the decimal expansion is performed offline and downloaded to the generator's storage system 65 through the I/O interface 14. All the remaining operations required to produce codewords can readily be performed in real-time. The generator employs a table look-up technique to generate the complex value sequence. The generator provides additional flexibility, in that the number of entries in the table determines the number of complex values used to quantize the numbers which compose the complex number sequence from which the codewords are generated. For example, the use of two discrete complex values (1,−1) for quantization, yields real-valued codewords with limited AWGN properties. Complete AWGN characteristics are produced using only eight discrete complex values (listed above in reference to step 40). Switching between codewords generated with different initial bases W and digit offsets p may be accomplished by storing the different bases and performing the rest of the calculations in real time.

Figure 4:
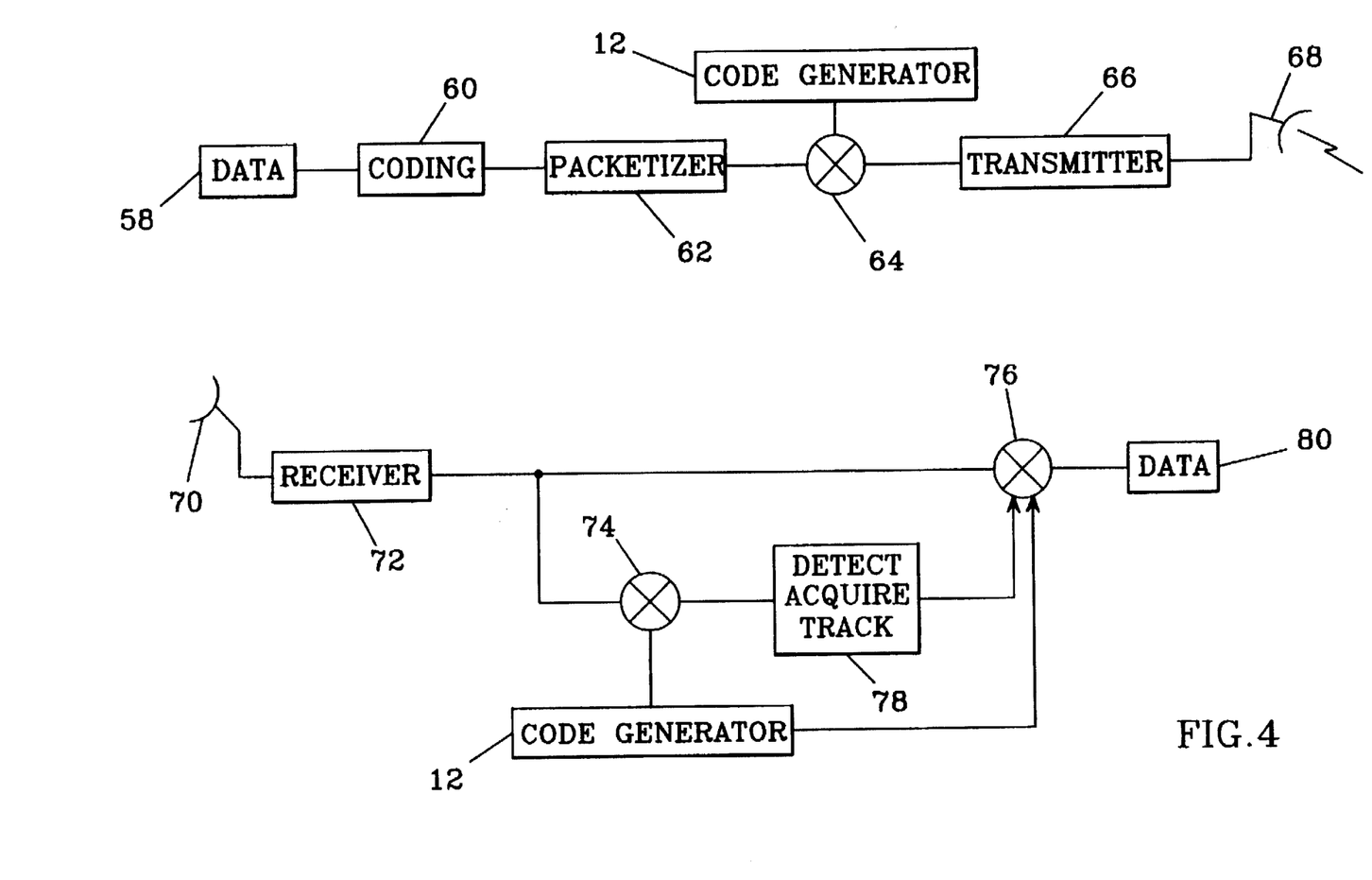
FIG. 4 is a block diagram of a communications system that employs the new codeword generator.

A spread spectrum communications system may employ the new code generator as illustrated in the block diagram of FIG.4. Digital data, which may include digitized voice, measurements, instructions, etc., is gathered in block 58 e.g., a multiplexer and passed to an encoder 60 which encodes the data for error detection and correction. After encoding, the data is sent to a packetizer 62 which formats the encoded data, adding headers, etc. A multiplier 64 then multiplies the data with codes generated by the new code generator 12. This operation is known, for a more detailed discussion see Raymond L. Pickholtz, Donald L. Schilling, and Laurance B. Millstein, Theory of Spread Spectrum Communications-A Tutorial, IEEE Transactions On Communications, VOL. COM.30, NO.5, May 1982, pp 855–884. The resulting digital signal is sent to the transmitter 66 where it is converted from digital to analog form, modulated, amplified, etc. and passed to a transmitting antenna 68.

On the receiving end, an antenna 70 receives the signal transmitted by the antenna 68. A receiver 72 amplifies the received signal, demodulates it and converts it to digital form. The resulting digital data stream is sent to multipliers 74 and 76. A new code generator 12 provides codes to the multipliers 74 and 76 which are identical to those generated by the code generator on the transmit side of the communications system. A detect, acquire, and track system 78 determines from the output of the multiplier 74 when a signal from the transmitter 66 has been received, acquires the signal by "locking on" to it and tracks the signal and, in so doing, provides timing information to the multiplier 76 which allows it to synchronize codes from the generator 12 with the incoming data stream and produce an output data stream from which data symbols may be detected, after depacketizing, error detection and error correction in the data processor 80.

Figure 5:
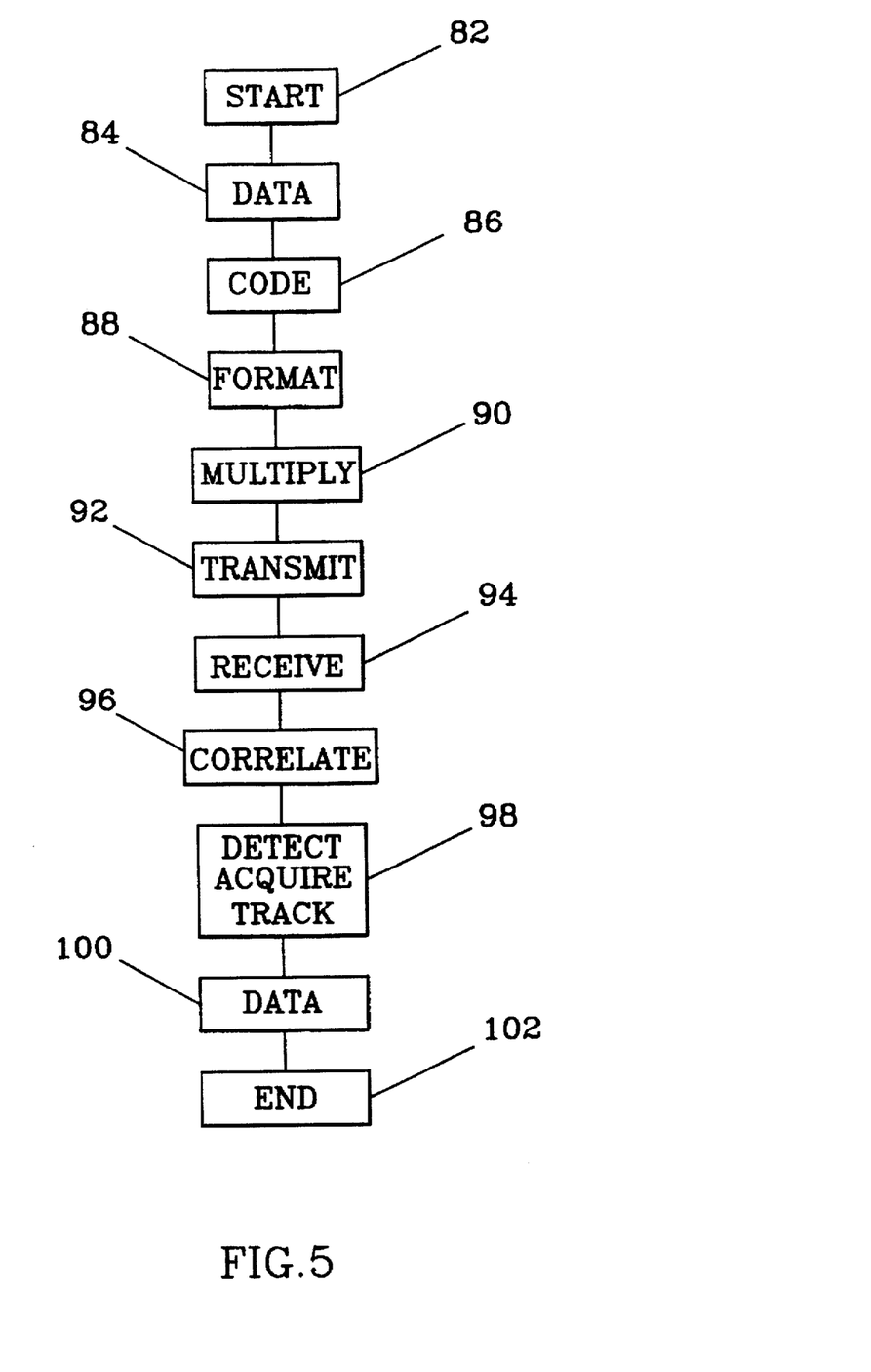
FIG. 5 is a flow chart that illustrates the operation of a communication system which employs the new codeword generator.

The flow chart of FIG. 5 illustrates the operation of the new code generator 12 within a spread spectrum communications system. Operation begins at step 82 and proceeds to step 84, where data is gathered for transmission. In step 86 the gathered data is encoded for error detection and correction, then, in step 88, the encoded data is formatted for transmission. In step 90 the formatted data is multiplied with codewords from the new code generator 12 thereby spreading the spectrum occupied by the data. In step 92 the transmitter transmits the data which has thus been encoded. This step includes a number of substeps, including digital to analog conversion, modulation, amplification, etc. that are known in the art.

In step 94 a receiver receives an electronic signal from a receiving antenna and, among other things, amplifies it with a low noise amplifier, demodulates the signal, and converts it from analog to digital form. The digital signal is then correlated in step 96 with identical codewords from a local codeword generator. In step 98 the transmitted data stream is detected, acquired and tracked using the results of the correlation of step 96. This provides synchronization for another correlation to be performed in step 100, using the same codewords, which yields the transmitted data in step 100. Operation proceeds until all data has been transmitted and received, then to step 102 the end.

Figure 6:
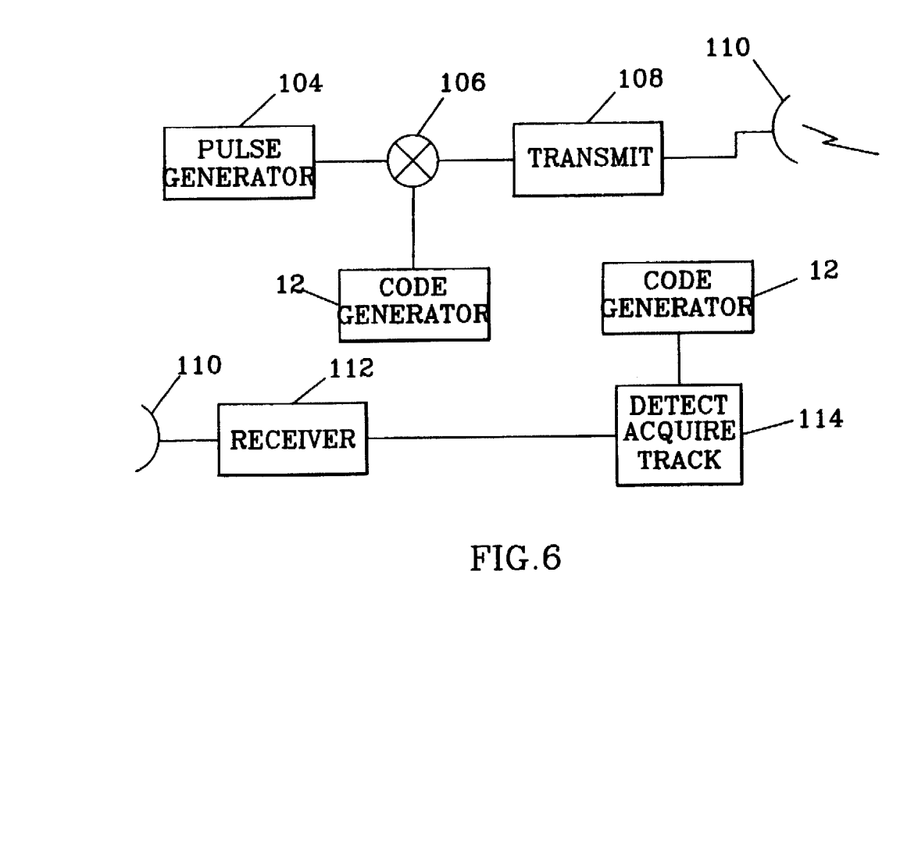
FIG. 6 is a block diagram of a RADAR system which employs the new codeword generator.

A RADAR system which employs the new code generator is illustrated in the block diagram of FIG. 6. A pulse generator 104 produces pulses which are multiplied in a multiplier 106 with codewords from the codeword generator 12. As noted in relation to FIG. 1, this process spreads the spectrum of the RADAR pulse, making it more difficult to detect by those without access to the code generator 12. The RADAR pulse is converted to an analog signal, modulated and amplified in a transmitter 108 then transmitted, via an antenna 110 to a target. A reflected pulse arrives at the antenna 110 and is routed to a receiver 112, where it is amplified, demodulated, and converted from analog to digital form. The resulting digital signal is routed to a detection, acquisition and tracking system 114 which also receives codewords from the codeword generator 12. The codewords are used to correlate and thereby detect, acquire, and track the reflected pulses. As is known in the art, the pulses are also Doppler processed and processed through "range gates". These processes yield information regarding the distance and relative speed of a reflecting target. Using various codewords enhances the discrimination of reflections from various targets.

Figure 7:
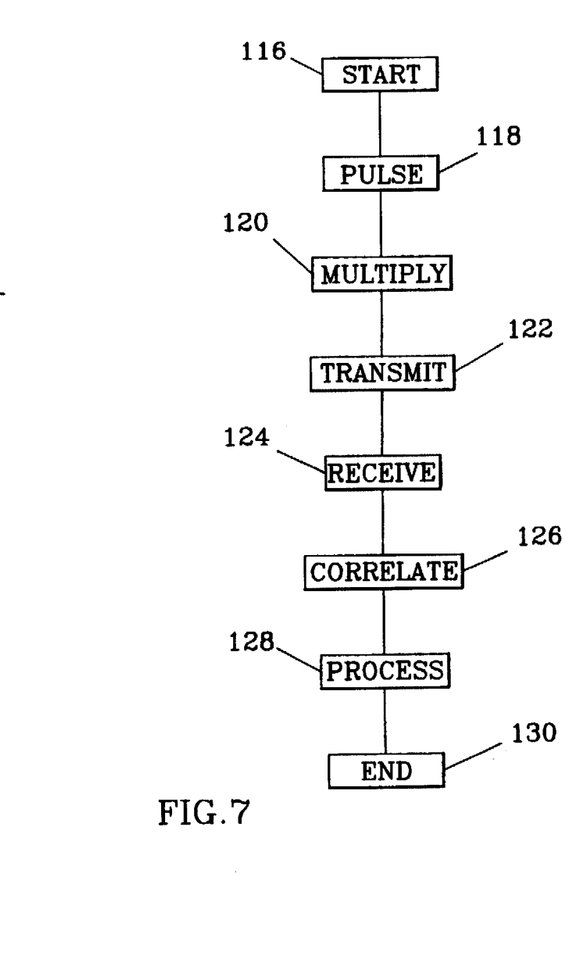
FIG. 7 is a flow chart depicting the use of the new codeword generator in the transmission and reception of a RADAR pulse.

The new code generator is employed within a RADAR system as illustrated in the flow chart of FIG. 7. Operation begins in step 116 and proceeds to step 118 where a pulse is generated. In step 120, the pulse generated in step 118 is multiplied by a codeword generated by the new code generator 12. This code may be varied, depending upon the intended target, thereby easing the task of discriminating returned pulses. After multiplying the pulse by a codeword, the pulse thus modified is converted to analog form, processed, amplified and transmitted in step 122. After the pulse is reflected and received, it is amplified, processed and converted to digital form in step 124. The digitized return is then correlated with codewords from the codeword generator to detect and acquire and track returning pulses in step 126. Additional processing, such as doppler processing and range determination is performed in step 128 and, from there, the operation proceeds to step 130, the end.

Codes generated by the new codeword generator are unlimited in either the length of codeword or in the number of codewords in a given family. Due to the random distribution of phases, an entire codeword is not predictable from just a portion of itself. This property is especially advantageous for secure communications applications. Although it is possible to predict a code family from an entire codeword, assuming that all the codewords in a family are generated from the same seed W and digit offset p, this predictability may be eliminated by creating code families consisting of codewords created from different values of W and p.

The forgoing description of specific embodiments of the invention has been presented for the purposes of illustration and description. It is not intended to be exhaustive or to limit the invention to the precise forms disclosed, and many modifications and variations are possible in light of the above teachings. For example, the quantizer could be implemented using the arithmetic logic unit. The embodiments were chosen and described in order to best explain the principles of the invention and its practical application, to thereby enable others skilled in the art to best utilize the invention. It is intended that the scope of the invention be limited only by the claims appended hereto.

We claim:

1. A codeword generator, comprising:
   a first mixing ergodic transformer connected to receive a decimal expansion of an irrational number and to transform said decimal expansion, thereby creating a first complex number sequence,
   a truncator connected to truncate said complex number sequence to a predetermined length thereby forming a first codeword, and
   a permuter connected to permute said truncated complex number sequence and to return permuted complex number sequences to said truncator, where said permuted sequences are truncated to produce a family of codewords.

2. The codeword generator of claim 1, further comprising:
   a correlator connected to autocorrelate said complex number sequence, and
   a controller connected to pass said complex number sequence to said truncator if the results of said autocorrelation satisfy a predetermined standard.

3. The codeword generator of claim 2, further comprising:
   a second mixing ergodic transformer connected to receive said decimal expansion of an irrational number and to transform the decimal expansion, thereby creating a complex number sequence different from said first complex number sequence, said truncator connected to receive and truncate said different complex number sequence and said permuter connected to permute said truncated different complex number sequence and to return permuted sequences to said truncator where said different permuted sequences are truncated to produce a different family of codewords.

4. A codeword generator for producing digital electronic signals that may be used, for example, as code division multiple access (CDMA) codes in spread spectrum communications systems, or as pulse-shaping codes in RADAR systems, comprising:
   a complex sequence truncator connected to truncate a complex number sequence and to thereby produce a first codeword,
   a codeword permuter connected to receive and permute said first codeword and to thereby produce additional codewords,
   an input/output system connectable to external circuitry to relay data and instructions between the external circuitry and said code generator,
   a communications link connecting said truncator, said codeword permuter, and said input/output system, and
   a controller connected through said communications link to control the operation of said truncator, said codeword permuter, and said input output system.

5. The codeword generator of claim 4, further comprising:
   a mixing ergodic transformer connected to transform a decimal expansion of an irrational number and to thereby generate and communicate said complex number sequence to said truncator.

6. The codeword generator of claim 5, further comprising:
   an irrational number decimal-expander connected to produce a decimal expansion of an irrational number and to provide said expansion to said mixing ergodic transformer.

7. The codeword generator of claim 6, further comprising:
   an autocorrelator connected to receive said complex number sequence from said mixing ergodic transformer and to generate a cyclic autocorrelation of said complex number sequence and to provide the results of said autocorrelation to said controller.

8. The codeword generator of claim 5, wherein said ergodic transformer comprises:

an arithmetic logic unit connected to communicate through said communications link, and digital storage media for storing data and instructions, said storage media connected through said communications link to said arithmetic logic unit and to said controller to provide data and instructions for said ALU.

9. The codeword generator of claim 8, wherein said irrational number decimal expander includes a lookup table connected through said communications link to said controller.

10. The codeword generator of claim 7, wherein said correlator comprises an ALU connected to communicate through said communications link, and digital storage media for storing data and instructions, said storage media connected through said communications link to said arithmetic logic unit and to said controller to provide data and instructions for said ALU and said controller, said controller employing said data and instructions to autocorrelate said complex number sequence.

11. The codeword generator of claim 7, further comprising a truncator connected through said communications link to, under control of said controller, truncate said complex number sequence and said codewords.

12. The codeword generator of claim 7, further comprising:

a permuter connected through said communications link to receive a codeword from said controller, to permute said codeword, and to thereby create other codewords.

13. A communications system, comprising:

a data stream generator, a codeword generator, comprising:

a first mixing ergodic transformer connected to receive a decimal expansion of an irrational number and to transform said decimal expansion, thereby creating a first complex number sequence, a truncator connected to truncate said complex number sequence to a predetermined length thereby forming a first codeword, and a permuter connected to permute said truncated complex number sequence and to return permuted complex number sequences to said truncator, where said permuted sequences are truncated to produce a family of codewords, a multiplier connected to multiply said data by said codewords, and a transmitter connected to, modulate, amplify, and transmit the resultant of said multiplication.

14. The communications system of claim 13, further comprising:

a receiver connected to receive, demodulate, and amplify signals, a codeword generator, comprising:

a first mixing ergodic transformer connected to receive a decimal expansion of an irrational number and to transform said decimal expansion, thereby creating a first complex number sequence, a truncator connected to truncate said complex number sequence to a predetermined length thereby forming a first codeword, and a permuter connected to permute said truncated complex number sequence and to return permuted complex number sequences to said truncator, where said permuted sequences are truncated to produce a family of codewords, a first correlator connected to correlate said data by said codewords, to thereby detect, acquire, and track incoming data, and to provide a synchronization signal, a second correlator connected to correlate, under control of said synchronization signal, said codewords by said data and to thereby produce a de-spread received data stream.

15. A RADAR system, comprising:

a pulse generator connected to produce RADAR pulses, a code generator, comprising:

a first mixing ergodic transformer connected to receive a decimal expansion of an irrational number and to transform said decimal expansion, thereby creating a first complex number sequence, a truncator connected to truncate said complex number sequence to a predetermined length thereby forming a first codeword, and a permuter connected to permute said truncated complex number sequence and to return permuted complex number sequences to said truncator, where said permuted sequences are truncated to produce a family of codewords, a multiplier connected to multiply said pulses by codewords produced by said code generator, and a transmitter connected to transmit the resultant of said multiplication.

16. The RADAR system of claim 15, further comprising:

a receiver connected to receive radio frequency signals, and a correlator connected to receive codes from said code generator and to correlate the received signal with said codes.

17. A method of generating codes, comprising:

(A) forming a sequence of complex numbers by ergodically transforming a decimal expansion of an irrational number, (B) truncating the sequence formed in step A to a desired code-word length, thereby forming a first codeword, (C) permuting the codeword formed in step B to produce additional codewords, (D) truncating the codewords formed in step C to the desired codeword length, and (E) producing a digital electronic signal corresponding to the value of said code.

18. The method of claim 17, further comprising:

(F) determining whether a predetermined number of codewords has been generated and, if not, employing a different ergodic transform from that used in step A to ergodically transform said sequence of complex numbers and repeating steps B through D until sufficient codewords have been generated.

19. A method of communicating data, comprising:

(A) generating codewords by:

(B) forming a sequence of complex numbers by ergodically transforming a decimal expansion of an irrational number, (C) truncating the sequence formed in step A to a desired codeword length, thereby forming a first codeword, (D) permuting the codeword formed in step B to produce additional codewords, (E) truncating the codewords formed in step C to the desired codeword length, and (F) producing a digital electronic signal corresponding to the value of said code, (G) determining whether a predetermined number of codewords has been generated and, if not, employing a different ergodic transform from that used in step A to ergodically transform said sequence of complex numbers and repeating steps B through D until sufficient codewords have been generated, (H) multiplying digital data signals by said codewords, (I) modulating the signal produced in step H, (J) amplifying the modulated signal produced in step I, and (K) coupling the amplified signal of step J to an antenna for transmission.

20. The method of communicating data of claim 19, further comprising the steps of:

(L) receiving a signal at an antenna and coupling the received signal to an amplifier, (M) amplifying the received signal, (N) demodulating the received signal, (O) generating codewords by:

(P) forming a sequence of complex numbers by ergodically transforming a decimal expansion of an irrational number, (Q) truncating the sequence formed in step P to a desired codeword length, thereby forming a first codeword, (R) permuting the codeword formed in step Q to produce additional codewords, (S) truncating the codewords formed in step R to the desired codeword length, and (T) producing a digital electronic signal corresponding to the value of said code, (U) determining whether a predetermined number of codewords has been generated and, if not, employing a different ergodic transform from that used in step A to ergodically transform said sequence of complex numbers and repeating steps Q through T until sufficient codewords have been generated, and (V) correlating the demodulated received signal by said codewords to correlate the codewords with the received signal, thereby decoding the received signal.

21. A method of transmitting and receiving a RADAR signal, comprising:

(A) generating codewords by:

(B) forming a sequence of complex numbers by ergodically transforming a decimal expansion of an irrational number, (C) truncating the sequence formed in step A to a desired codeword length, thereby forming a first codeword, (D) permuting the codeword formed in step B to produce additional codewords, (E) truncating the codewords formed in step C to the desired codeword length, and (F) producing a digital electronic signal corresponding to the value of said code, (G) determining whether a predetermined number of codewords has been generated and, if not, employing a different ergodic transform from that used in step A to ergodically transform said sequence of complex numbers and repeating steps B through D until sufficient codewords have been generated, (H) generating pulse signals, (I) encoding said pulses by multiplying said pulses by said codewords, (J) transmitting said encoded pulses, (K) receiving radio frequency signals, and (L) correlating said received signals with said codewords to detect, acquire, and track reflected pulses.

22. The method of claim 21 further comprising the steps of:

(M) determining the range from which pulses were reflected, (N) determining the relative velocity of the target which reflected the pulses, and (O) discriminating among various reflecting targets.

* * * * *